(12) United States Patent
Ludwick

(10) Patent No.: US 8,474,871 B1
(45) Date of Patent: Jul. 2, 2013

(54) VEHICLE FRAME

(76) Inventor: Eric Ludwick, Mishawaka, IN (US)

( * ) Notice: Subject to any disclaimer, the term of this patent is extended or adjusted under 35 U.S.C. 154(b) by 0 days.

(21) Appl. No.: 13/427,278

(22) Filed: Mar. 22, 2012

Related U.S. Application Data

(63) Continuation of application No. 61/466,300, filed on Mar. 22, 2011.

(51) Int. Cl.
  *B62D 63/06* (2006.01)
  *B62D 21/20* (2006.01)
  *B62D 53/04* (2006.01)

(52) U.S. Cl.
  USPC ......... 280/789; 280/423.1; 280/781; 280/785

(58) Field of Classification Search
  USPC ............... 280/137.5, 423.1, 424, 433, 441.1, 280/441.2, 781, 785, 789, 797
  See application file for complete search history.

(56) References Cited

U.S. PATENT DOCUMENTS

| | | | | |
|---|---|---|---|---|
| 2,494,115 A | * | 1/1950 | Bock et al. | 280/795 |
| 3,003,810 A | * | 10/1961 | Kloote et al. | 296/181.3 |
| 3,036,856 A | * | 5/1962 | Bock | 296/184.1 |
| 3,042,423 A | * | 7/1962 | Bock | 280/789 |
| 3,254,914 A | * | 6/1966 | Steck | 52/143 |
| 3,711,581 A | * | 1/1973 | Fowler et al. | 264/46.5 |
| 4,534,589 A | * | 8/1985 | Booher | 296/184.1 |
| 5,401,050 A | * | 3/1995 | Baker | 280/656 |
| 5,417,453 A | * | 5/1995 | VanDenberg | 280/785 |
| 5,429,066 A | | 7/1995 | Lewit et al. | |
| 5,664,518 A | | 9/1997 | Lewit et al. | |
| 5,897,818 A | | 4/1999 | Lewit et al. | |
| 6,013,213 A | | 1/2000 | Lewit et al. | |
| 6,023,806 A | * | 2/2000 | Dumlao et al. | 14/73 |
| 6,206,669 B1 | | 3/2001 | Lewit et al. | |
| 6,497,190 B1 | | 12/2002 | Lewit et al. | |
| 6,712,418 B1 | * | 3/2004 | Lathers | 296/100.02 |

\* cited by examiner

*Primary Examiner* — Joseph Rocca
*Assistant Examiner* — Laura Freedman
(74) *Attorney, Agent, or Firm* — Botkin & Hall, LLP

(57) ABSTRACT

A frame for recreational vehicles having a pair of oppositely spaced longitudinal frame members, having notches completely therethrough. The longitudinal frame members have a foam core in direct contact with a woven fiber fabric on an exterior of the longitudinal frame members with fabric flaps extending therefrom. The frame has a plurality of transverse stringers having a foam core in direct contact with a woven fiber fabric on an exterior of stringers that rest in notches of the longitudinal members. The stringers are complementary to the notches in the longitudinal members and the stringers have fabric flaps that extend along their length on opposite sides. The stringers extend completely through the longitudinal frame members. The flaps on the longitudinal frame members and the stringers are in overlapping contact. A deck having a layer of fabric covers the stringers, the flaps, and the longitudinal frame members and is impregnated with resin.

7 Claims, 6 Drawing Sheets

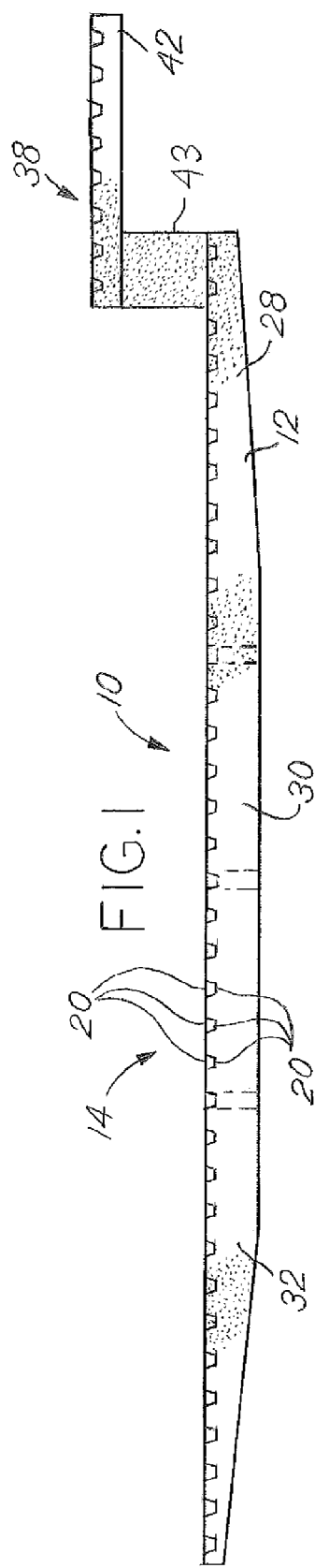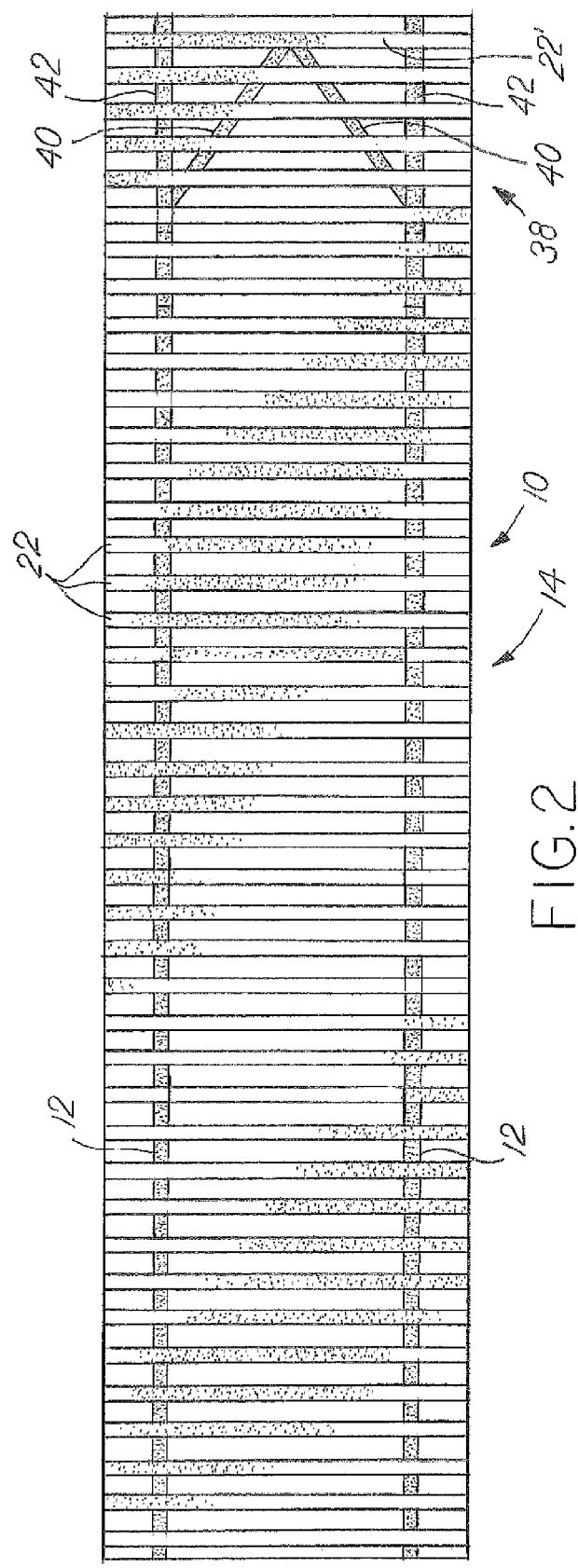

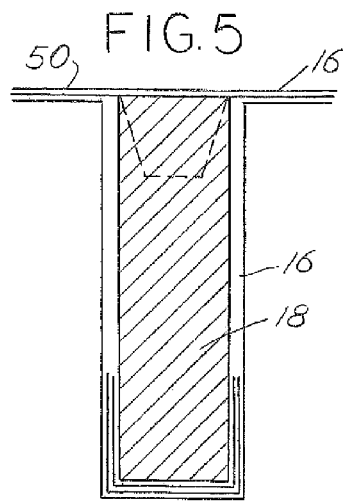
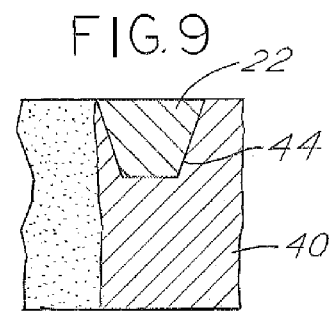
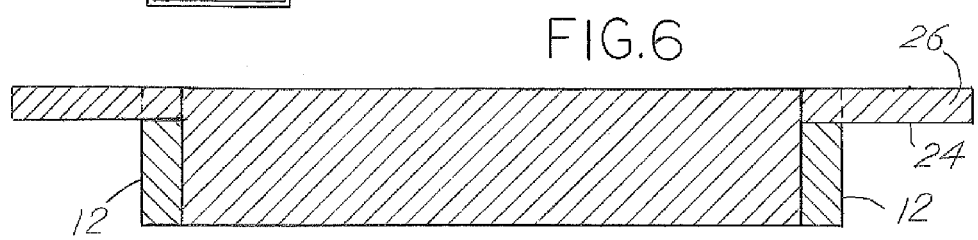
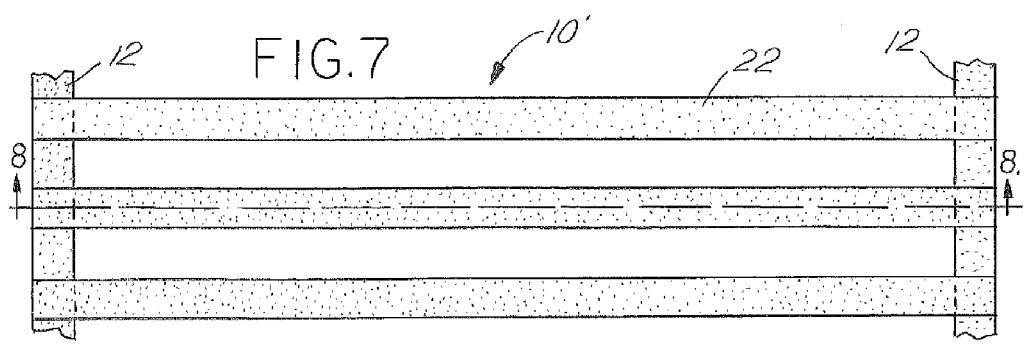
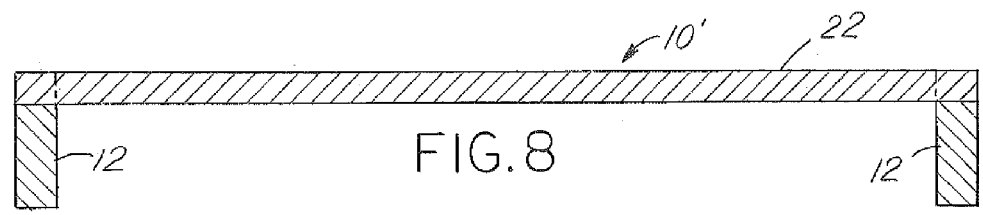

VEHICLE FRAME

CROSS REFERENCE TO RELATED APPLICATIONS

This application claims the benefit of U.S. Provisional Application No. 61/466,300, filed Mar. 22, 2011, the disclosure of which is hereby incorporated by reference.

BACKGROUND OF THE INVENTION

Frames for vehicles, especially towable recreational vehicle trailers and motorized recreational vehicles (RVs), are typically made of steel. Steel is certainly a durable material for producing a frame, but it does have disadvantages. Weight is a primary drawback to using steel for framing an RV. The weight in a steel frame is due to the considerable weight of the material itself and also due to its shape. Generally, RV frames are made from readily available I-beams or tubular sections of a standard size. These I-beams and tubes are of a constant cross section along their entire length. However, this does not place the most material in areas of high stress where it is needed most nor does a constant cross sectional beam reduce material where less is needed as in areas of low stress.

Assembling a steel vehicle frame is difficult. During assembly there will typically be two longitudinal beams running the length of the RV and stringers or cross members will be placed across the longitudinal beams. At each junction of the stringers and longitudinal beams a connection must be made. These connections are made by welding or mechanically fastening the beams and stringers together. This takes a great deal of time and provides potential for mistakes. After the beams and stringers are mated, an additional step of attaching a deck must be made so that an RV may be built upon the frame. The deck that is attached to the steel frame may be made of wood, aluminum, or could structural steel. Attaching the deck to the frame is accomplished with many screws driven through the deck into the frame. This method of joining the deck to the frame is not only time consuming, but does not produce a continuously integrated deck and frame. In the case that the deck is wood, it must be protected from the elements below.

The geometry of a steel frame for an RV is not ideal. As mentioned above, uniform cross sections have the same height at the ends and at the middle. Ideally, less material would be placed at the ends so that more adequate ground clearance could be had at the front and rear of the vehicle. Also, in attaching the stringers to a traditional longitudinal beam, height is added to the vehicle as the stringers rest on top of the beams. This is height that is not available for living space within the vehicle due to height restrictions. This added height can also raise the center of gravity of the vehicle, which may be detrimental to the handling of the vehicle.

SUMMARY OF THE INVENTION

The present invention is for a frame for recreational vehicles having a pair of oppositely spaced longitudinal frame members, having notches completely therethrough. The longitudinal frame members have a foam core in direct contact with a woven fiber fabric on an exterior of the longitudinal frame members. The longitudinal frame members have fabric flaps that extend from them. The frame has a plurality of transverse stringers having a foam core in direct contact with a woven fiber fabric on an exterior of the stringers. The stringers rest in the notches of the transverse members. The stringers are complementary to the notches in the longitudinal members and the stringers have fabric flaps that extend along their length on opposite sides. The stringers extend completely through the longitudinal frame members. The flaps on the longitudinal frame members and the stringers are in overlapping contact. A deck covers the stringers and the longitudinal frame members. The deck has a layer of fabric and the flaps on the stringers and the flaps on the longitudinal members contact the deck. The stringers, the flaps, and the longitudinal frame members being impregnated with resin.

BRIEF DESCRIPTION OF THE DRAWINGS

FIG. 1 is a side view of the composite RV frame without upper deck;

FIG. 2 is a top view of the frame shown in FIG. 1 with the upper deck removed;

FIG. 5 is a sectional view taken about the line 5-5 in FIG. 2;

FIG. 6 is a sectional view taken about the line 6-6 in FIG. 2;

FIG. 7 is a broken top view of another embodiment having the longitudinal beams placed at the ends of the stringers;

FIG. 8 is a sectional view taken about the line 8-8 in FIG. 7;

FIG. 9 is a sectional view taken about the line 9-9 in FIG. 4; and

DETAILED DESCRIPTION OF INVENTION

The frame 10 of the present invention is particularly well suited to a fifth wheel recreational vehicle RV. The overall design may also be used with other types of RVs as well. Although, a fifth wheel trailer is shown, it is not necessarily limited to being used in a fifth wheel configuration, but may be used for a ball type hitch trailer as well. Any trailer needing a long flat expanse will benefit from the construction of this invention. Examples of such trailers may be horse trailers and cargo trailers as well as others. The frame 10 has longitudinal beams 12 running most of the length of the frame 10 in its main section 14. The longitudinal beams 12 are substantially parallel to each other and are made of a composite material. The composite material may be a fiberglass thermoset polymer composite, or can also be carbon fiber in a polymer matrix. The polymer of either type of composite is typically sprayed on fabric 21 made of the desired fibers. In the case of the frame 10 shown in the FIGS., the fabric 21 is woven fiberglass. Carbon fiber or other fibers may be woven into fabric that will be suitable for the present invention, however, woven fiberglass is an extremely cost effective choice that provides ample strength necessary for the frame 10. The longitudinal beams 12 are of a lesser height at the ends and taller near the middle. This is done to optimize weight of the beams 12. More material and a greater cross sectional moment of inertia is provided near the middle where the bending stresses are greatest. Less material is provided near the ends where the bending stresses are the least. The longitudinal beams 12 may also be tapered laterally, in addition to the vertical taper shown in FIG. 1. FIG. 6 shows a cross section of the longitudinal beam, however, this particular beam is not tapered laterally.

An additional benefit of the shape of the longitudinal beams 12 is that the vehicle can be lower to the ground than would be possible if the longitudinal beams 12 were of uniform height along their entire length. In a completed RV the wheels will be placed near the center of the longitudinal beams 12. As such, increased ground clearance will be achieved at the ends of the beams 12.

Figure 3:
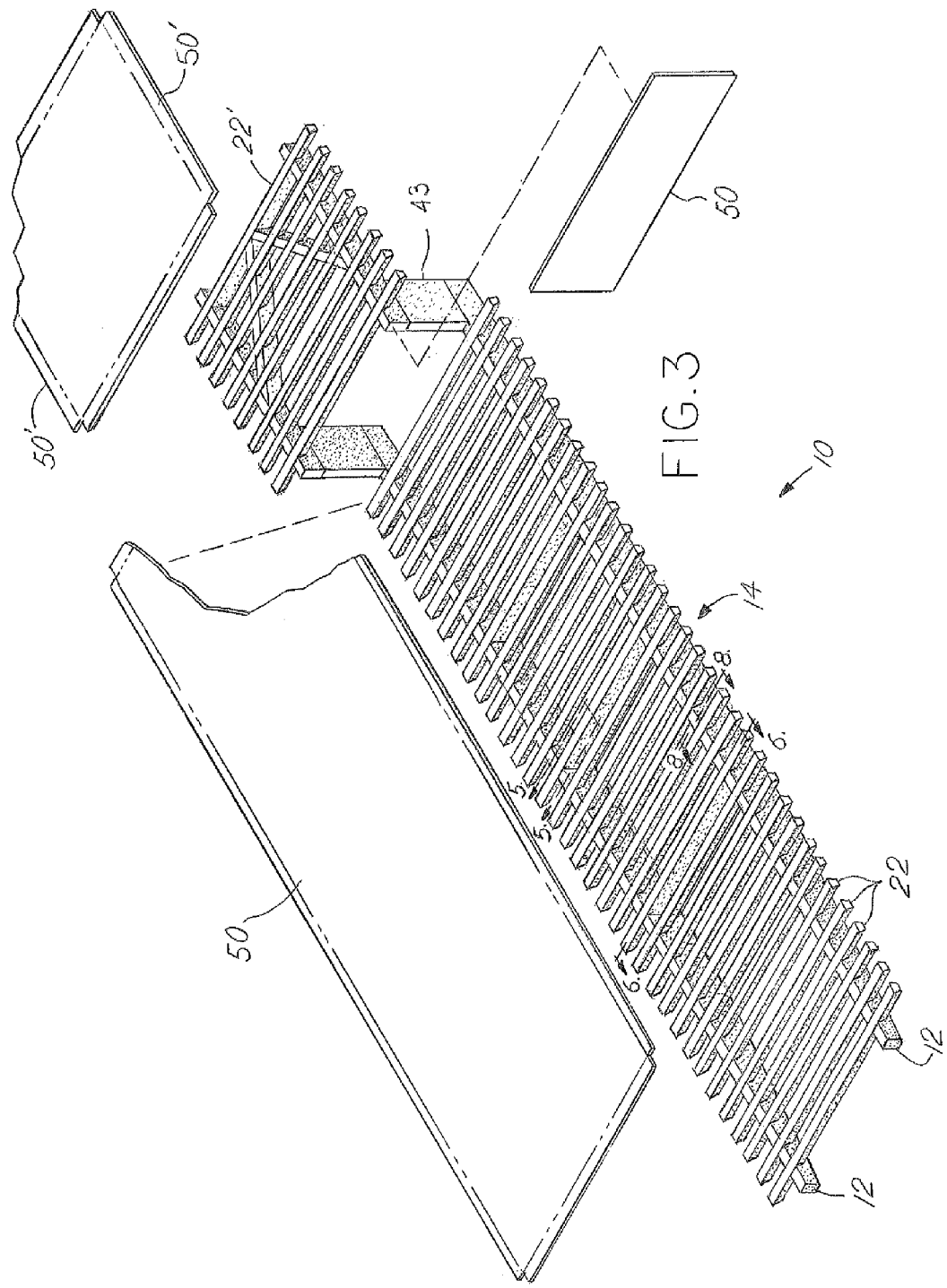
FIG. 3 is an exploded perspective view of the frame shown in FIGS. 1 and 2.
Figure 4:
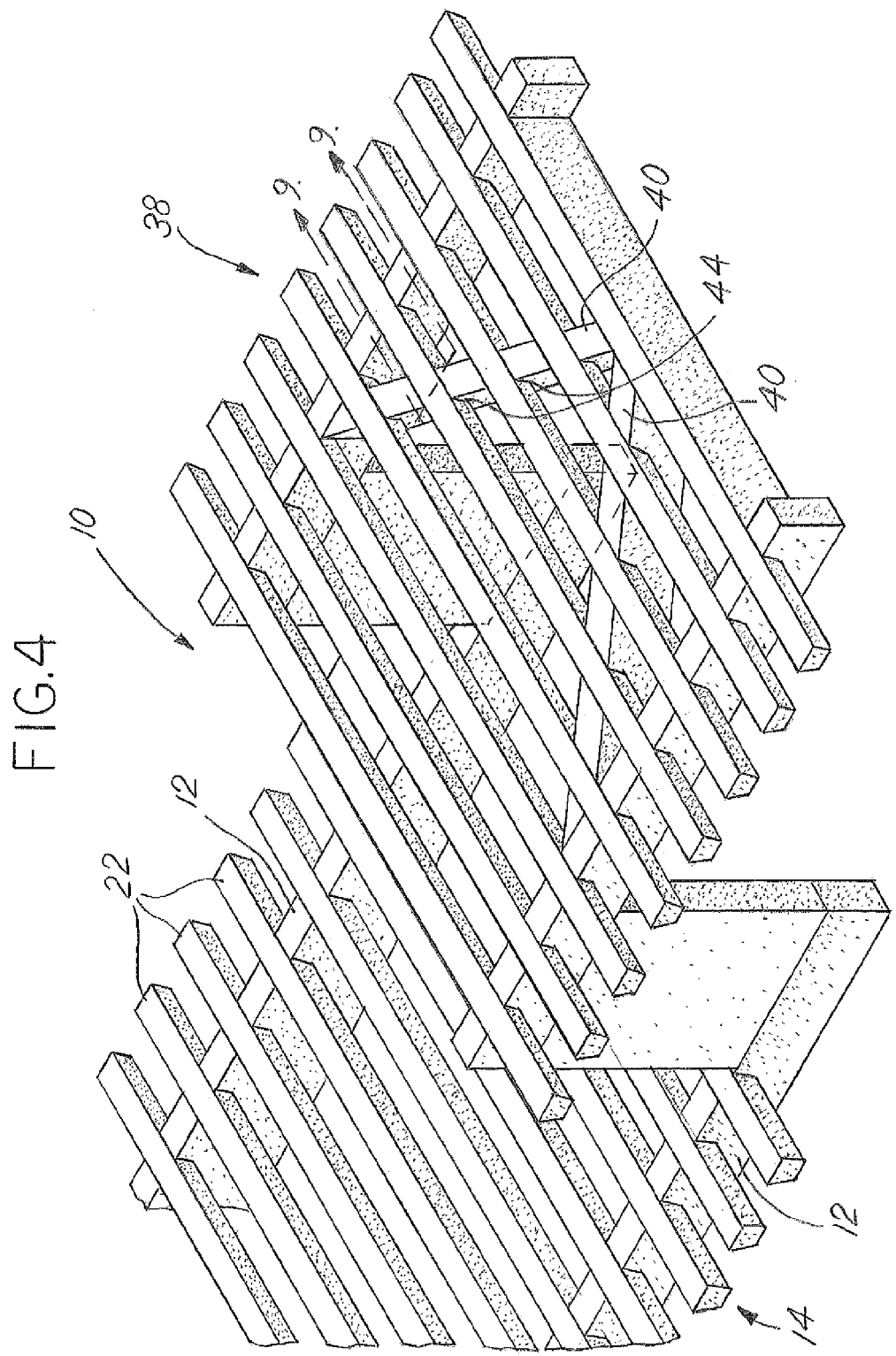
FIG. 4 is a perspective view of a forward gooseneck portion of the frame shown in FIGS. 1-4.
Figure 10:
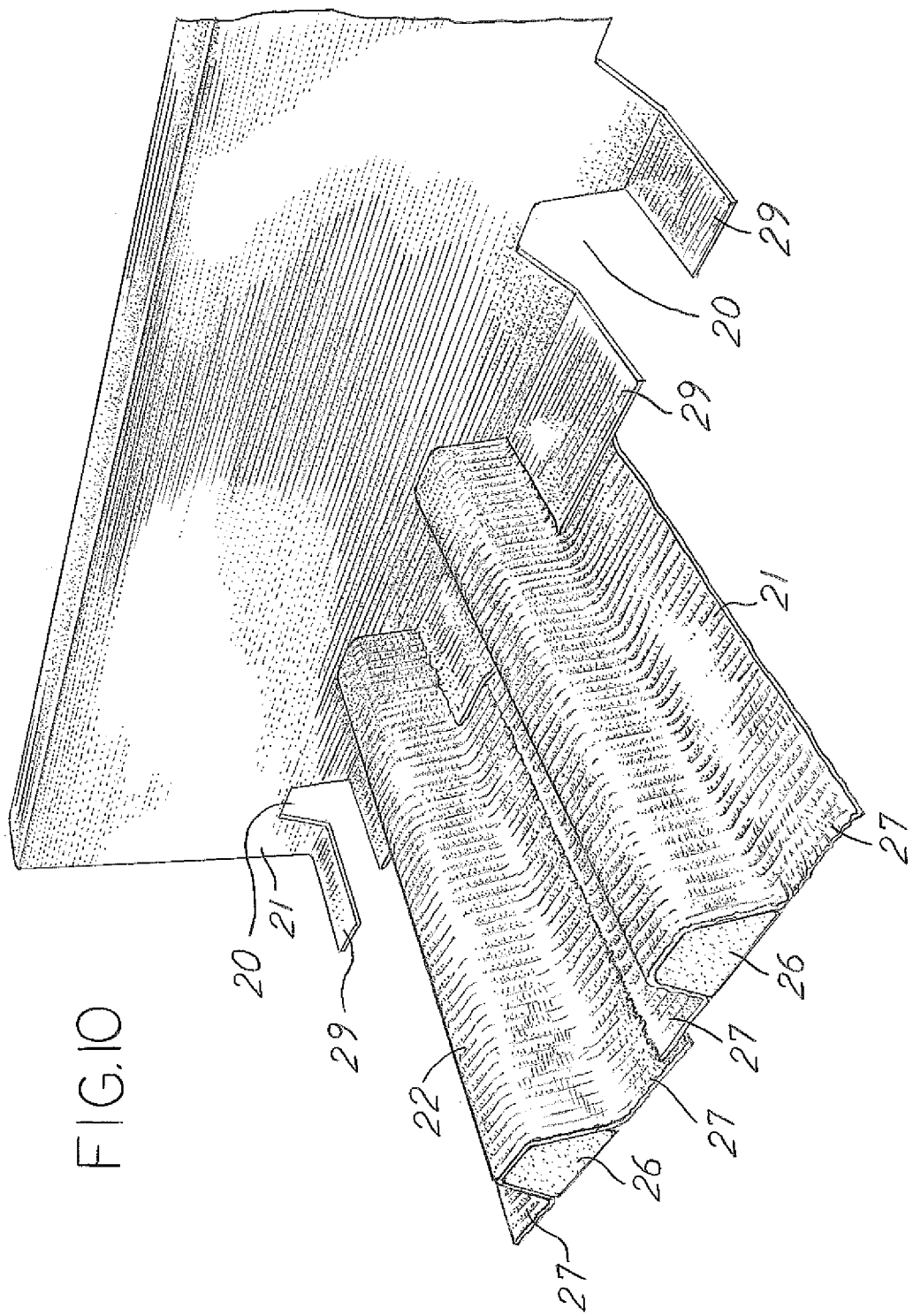
FIG. 10 is a perspective view of a longitudinal beam and stringers without the resin cured into the fibrous fabric.

FIG. 5 shows a composite layer 16 over a foam core 18. The foam core 18 is the desired shape of the final beam 12, minus the thickness of the composite layer 16. The foam may be extruded polystyrene, expanded polystyrene, Styrofoam®, or other similar lightweight foam products. Although the foam core 18 does not have great mechanical strength, its combination with the composite layer 16 produces structure that is extremely strong per its unit weight. FIG. 10 shows a portion of a beam 12 before resin is cured into the fibrous fabric 21. The foam core 18 directly contacts the woven fiberglass fabric 21.

The longitudinal beams 12 have a series of notches 20, that are shown in FIG. 1, for accepting stringers 22. Each stringer 22 extends completely through the longitudinal beams 12. The stringers 22 are constructed similarly to the longitudinal beams 12. Each has a composite layer 24 and a foam core 26. FIG. 10 shows stringers 22 before the resin is cured into the fabric 21. Large lateral flaps 27 extend from the sides of each stringer 22 near the widest portion of each stringer 22, which is the upper side of the stringers 22. The lateral flaps 27 of the stringers 22 are woven fiberglass fabric 21 and are extensions of the fabric surrounding the foam core 26 of the stringers 22. As can also be seen flaps 27 on the stingers 22 overlap with flaps 29 on the longitudinal beam 12. The flaps on the longitudinal beams 12 are also extensions of the woven fiberglass fabric 21. As such, the overlapping flaps 27, 29 as seen in FIG. 10 will provide direct contact between woven layers of the fiberglass fabric 21. This provides a very secure interlock and fully integrates the stringers 22 with the longitudinal beams 12 when both are cured with resin to form a continuous composite layer 16. The stringers 22 have a consistent cross section along their length. As can be seen in FIG. 5, the stringers have a trapezoidal cross sectional shape. This is to optimize their strength to weight because the composite layer 24 is stronger in tension than compression, thus, less material is needed on the lower portion of the stringers 22.

Figure 11:
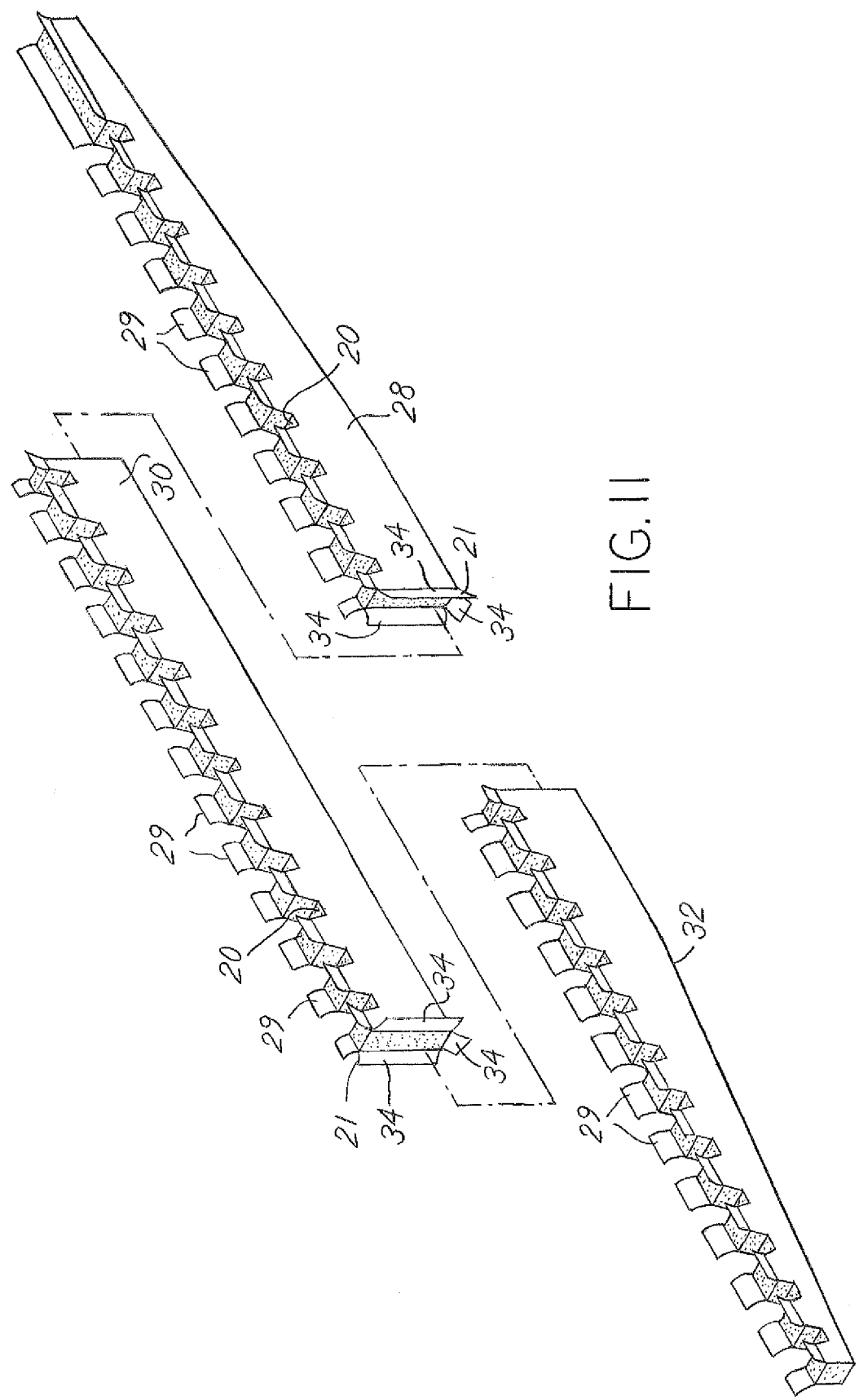
FIG. 11 is a perspective exploded view of a longitudinal beam exploded.

The frame 10 is built as an assembly of pieces connected by resin sprayed on fabric that connects individual pieces. The pieces begin as molded preforms filled with foam, with the fabric containing no resin. The stringers 22 and longitudinal beams 12 hold their shape before being impregnated by resin due to the fact that they are filled with foam that is in direct contact with the woven fabric. The stringers 22 extend completely through the longitudinal beams 12 and are placed through the longitudinal beams 12 dry. The fabric on the pieces may be saturated with resin by other methods of application such as rolling the resin onto the pieces, but typically a spray on application is most desirable for rapid mass production. The longitudinal beams 12 are made of three separate pieces, a front end piece 28, a middle piece 30 and a rear end piece 32. FIG. 11 shows the pieces 28, 30, 32. Some of the pieces 28, 30, 32 have fabric flaps 34 that are placed over an adjacent piece 28, 30, 32 and sprayed with resin to bond them to the adjacent piece 28, 30, 32. FIG. 11 shows how the pieces 28, 30, 32 are assembled to faun a longitudinal beam 12. Flaps 34 near the ends are used to join adjacent pieces 28, 30, 32 of the longitudinal beams 12. Flaps 29 near the upper portions of the pieces 28, 30, 32 are used to join deck 50 that will be placed over the top of the beams 12.

The front portion of the frame 10 has a stepped up gooseneck portion 38 that is designed to have a fifth wheel hitch mounted to it. The gooseneck portion includes an upper deck 50' that will be placed on top of the gooseneck portion. The gooseneck portion has upper longitudinal beams 42 that support stringers 22. The upper longitudinal beams 42 are attached to longitudinal beams 12 with vertical supports 43. The upper longitudinal beams 42 fabric flaps that extend from them similarly to the flaps 29 on longitudinal beams 12. Because this area of a finished RV will have a great deal of stress from weight of the vehicle and towing force placed upon it, reinforcement beams 40 are placed between the outer beams 42 of the gooseneck 38. These beams 40 are angled toward the midpoint of the forward most stringer 22' and are connected to stringer 22' at their forward ends. The reinforcement beams 40 have angled notches 44 to receive the stringers 22 that pass through them and are joined to the upper longitudinal beams 42 behind the forward most stringer 22'.

Deck 50 is integral with the tops of all the stringers 22 and the longitudinal beams 12 for the entire length of the frame 10. The deck 50 is also applied to the gooseneck portion 38. The deck is a composite made of the fibers mentioned above and cured resin. When making the frame 10, a sheet of the woven fabric made from the fibers is placed on a mold and the rest of the frame 10 is assembled upon the fabric, after it is wetted with resin. The flaps 27, 29 on the stringers 22 and beams 12 cure into the deck to form an integral structure. This forms a continuous bond with the deck 50 everywhere it contacts the stringers 22 and beams 12. The flaps 29, 27 on the longitudinal beams 12 and stringers 22 are integrally bonded within the deck 50 as the resin soaks through both the flaps 29, 27 and the deck 50. The flaps 27, 29 form layers of the deck that are additional to layers of woven fabric that is applied on top of the stringers 22 and longitudinal beams 12, and thus form a unibody structure. The unibody structure meaning that all of the parts are integrally joined to form a single unit lacking any separate pieces. This unibody structure forms a more rigid structure for a given amount of weight than could be had with separately joining pieces mechanically or using adhesive bonding.

Each part below the deck 50 has its fibers contributing to the material in the deck in areas not directly supported by underlying beams 12 or stringers 22. The longitudinal beams 12 have their flaps 29 that extend inwardly. The stringers 22 have their flaps 21 that overlap and extend between respective adjacent stringers. Thus, there are at least three layers of bonded woven fabric adjacent to the longitudinal beams excluding the fabric in the deck 50 is applied. This relationship is illustrated in FIG. 10. With the deck fabric applied, the deck 50 will have four layers of woven fabric in contact adjacent to the longitudinal beams 12. It is contemplated that the flaps 29 on the longitudinal beams may extend until they meet between the longitudinal beams 12, and thus, it is possible to have 4 layers of contacting integrally bonded fabric throughout the deck using only one sheet of fabric on the top of the deck.

An additional embodiment may be made as shown in FIGS. 7 and 8. In this version of the frame 10', the longitudinal beams 12 are placed at the ends of the stringers 22. This provides an opportunity to bond vertical walls directly to the longitudinal beams 12 of the frame 10'. Construction of this manner forms an extremely rigid vehicle.

When making the frame 10 of this invention. A first step is to place a sheet of fabric used to form the deck 50 on a flat form. The flat form is placed so that the frame 10 will be constructed upside down. Then stringers 22 are placed on the deck 50 appropriately spaced to fit within notches 20 of the longitudinal members 12. The flaps 27 on the stringers are placed so they overlap, and the flaps 29 on the longitudinal members 12 are place so they overlap the overlapping flaps 27, as shown in FIG. 10. The upper deck 50' fabric is placed on a deck that is lower than that of the form used to form the first deck 50. Stringers 22 are placed onto the upper deck 50' fabric and the reinforcement beams 40 are placed on top of the stringers 22 along with the upper longitudinal beams 42. Supports 43 are placed so they span the longitudinal members 12 and upper longitudinal members 42. When the individual pieces of the frame 10 are placed, the entire frame 10 is coated with resin to impregnate all of the fabric and cured. Once cured, the frame 10 is removed from the forms and flipped right side up.

The invention is not limited to the details given above, but may be modified within the scope of the following claims.

What is claimed is:

1. A frame for recreational vehicles comprising:
   a pair of oppositely spaced longitudinal frame members, including notches completely therethrough, said longitudinal frame members having a foam core in direct contact with a woven fiber fabric on an exterior of said longitudinal frame members, said longitudinal frame members including fabric flaps extending therefrom;
   a plurality of transverse stringers having a foam core in direct contact with a woven fiber fabric on an exterior of said stringers and said stringers resting in said notches of said longitudinal frame members, said stringers being complementary to said notches in said longitudinal frame members and said stringers including fabric flaps extending along their length on opposite sides, said stringers extending completely through said longitudinal frame members, said flaps on said longitudinal frame members and said stringers in overlapping contact;
   a deck covering said stringers and said longitudinal frame members, said deck including a layer of fabric and said flaps on said stringers contacting said deck, said flaps on said longitudinal members overlapping onto said flaps on said stringers, said stringers, said flaps, and said longitudinal frame members being impregnated with resin so that said flaps on said stringers, said flaps on said longitudinal members and said layer of fabric of said deck form an integral structure after said resin is cured.

2. The frame as claimed in claim 1, said deck contacting said longitudinal members being a first deck, said frame further comprising, an upper deck covering a gooseneck portion including a plurality of stringers extending through and supported by upper longitudinal members, said upper deck being located above said first deck.

3. The frame as claimed in claim 2, wherein said gooseneck portion includes angled reinforcement members, said reinforcement members obliquely angled with respect to said upper longitudinal members and including angled notches for receiving said stringers extending completely through and beyond said reinforcement members.

4. The frame as claimed in claim 3, wherein said stringers extend beyond said longitudinal members.

5. The frame as claimed in claim 4, wherein said reinforcement members contact at forward ends, said forward ends of said reinforcement members being connected to a forward most stringer.

6. A method for making a vehicle frame comprising the steps:
   placing a fabric layer upon a first flat form;
   placing stringers on said fabric layer, said stringers having a foam core covered by woven fabric on an exterior of said foam core, said woven fabric in direct contact with said foam core, said woven fabric including lateral flaps extending from said stringers;
   overlapping said lateral flaps on adjacent said stringers;
   placing longitudinal members over said stringers, said longitudinal members including notches that are placed over said stringers and said notches being complementary to said stringers, said stringers extending completely through said longitudinal members, said longitudinal members having a foam core covered by woven fabric on an exterior of said foam core, said woven fabric in direct contact with said foam core, said woven fabric including flaps extending from said longitudinal members;
   overlapping said flaps on said longitudinal members onto said flaps on said stringers;
   coating said stringers and said longitudinal members with resin; and
   curing said resin.

7. The method of claim 6 further comprising:
   placing a second fabric layer on a second flat form, said second flat form being below said first flat form;
   placing stringers on said second flat form;
   placing upper longitudinal members over said stringers on said second flat form, said upper longitudinal members having a foam core covered by woven fabric on an exterior of said foam core, said woven fabric in direct contact with said foam core, said woven fabric including flaps extending from said upper longitudinal members, said upper longitudinal members having notches that are complementary to said stringers placed on said second flat form, said stringers on said second flat form passing completely through said upper longitudinal members;
   overlapping flaps on said upper longitudinal members with adjacent flaps on said stringers;
   connecting said upper longitudinal members with said longitudinal members;
   coating said second fabric layer, said upper longitudinal members, and stringers extending therethrough with resin; and
   curing said resin.

* * * * *